United States Patent [19]

Kiessling et al.

[11] 4,280,041

[45] Jul. 21, 1981

[54] APPARATUS FOR ARC WELDING OR PLASMA CUTTING

[75] Inventors: Werner Kiessling, Eching; Wolfgang Lookhof, Stein-Laboe, both of Fed. Rep. of Germany

[73] Assignee: Messer Griesheim, Frankfurt am Main, Fed. Rep. of Germany

[21] Appl. No.: 940,371

[22] Filed: Sep. 7, 1978

[30] Foreign Application Priority Data

Sep. 15, 1977 [DE] Fed. Rep. of Germany ....... 2741469

[51] Int. Cl.³ .......................... B23K 9/10; B23K 9/00
[52] U.S. Cl. .......................... 219/121 PT; 219/130.01; 219/121 PY; 324/73 R
[58] Field of Search ....................... 219/121 P, 130.01; 324/73 R, 73 AT, 16.5

[56] References Cited

U.S. PATENT DOCUMENTS

| 3,058,061 | 10/1962 | Smith | 324/73 R |
| 3,632,960 | 1/1972 | Jesnitzer et al. | 219/130.01 |
| 4,103,141 | 7/1978 | Wristen | 219/130.01 |

FOREIGN PATENT DOCUMENTS 2452134  6/1976  Fed. Rep. of Germany ........ 324/73 R

OTHER PUBLICATIONS

"Underwater Plasma Arc Cutting," Welding Journal 1-1976, pp. 15-24.
"A Computer Controlled System for Testing Digital Logic Modules,"—by Hewlett Packard Journal-3-19-69—pp. 14-20.

*Primary Examiner*—Gene Z. Rubinson
*Assistant Examiner*—M. Paschall
*Attorney, Agent, or Firm*—Connolly and Hutz

[57] ABSTRACT

An arc welding or plasma cutting apparatus has a current source as well as a set of controls for the welding or cutting process and includes a diagnosis apparatus which can be hooked up to the current source and/or the controls.

4 Claims, 3 Drawing Figures

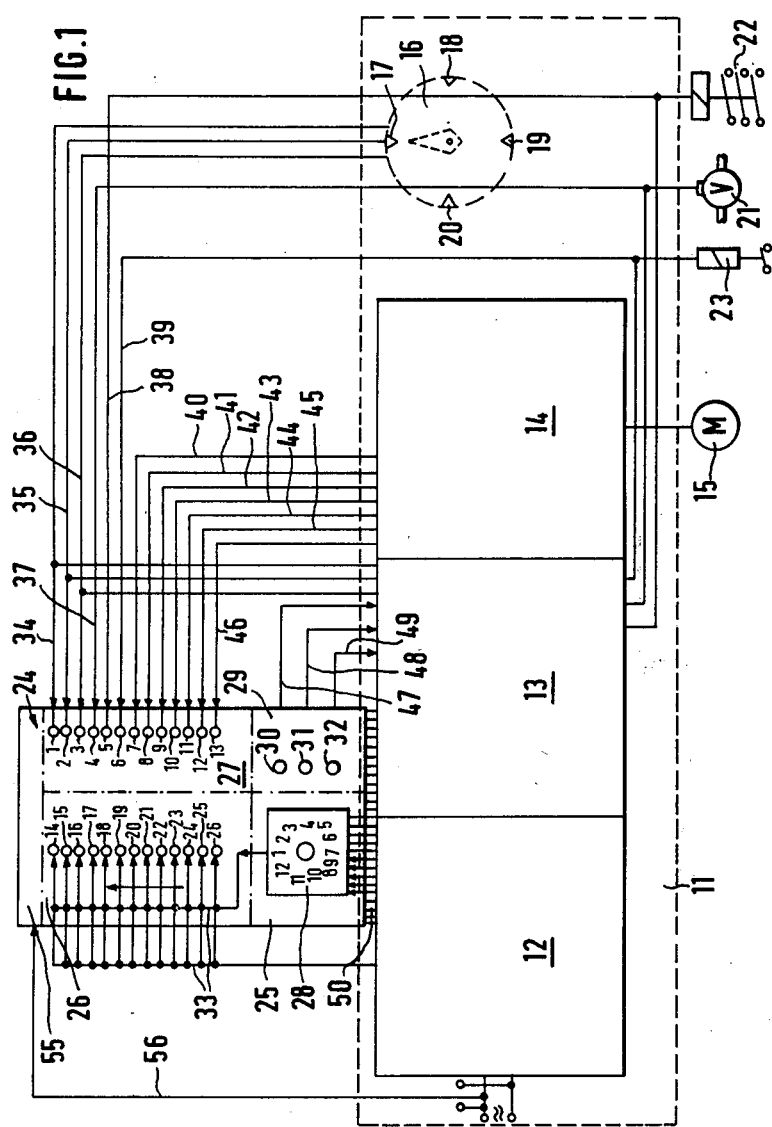

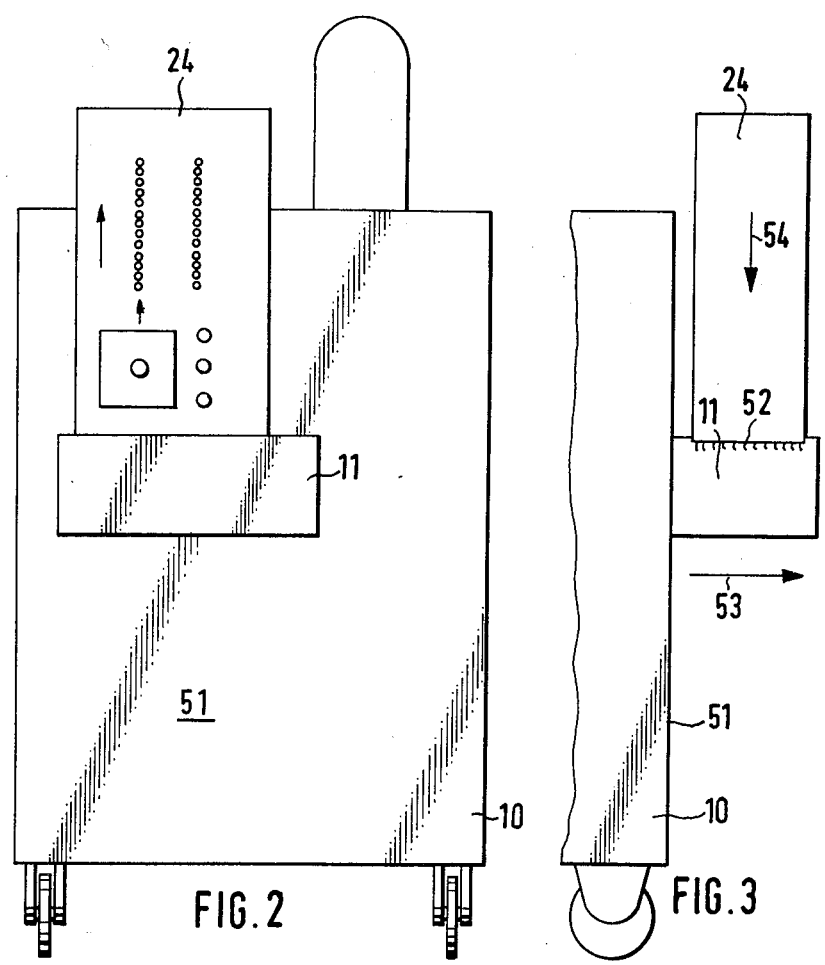

APPARATUS FOR ARC WELDING OR PLASMA CUTTING

BACKGROUND OF THE INVENTION

The present invention relates to an apparatus for arc welding or plasma cutting with a current source as well as a set of controls to influence the welding or cutting process respectively.

The known apparatus of this type essentially consists of a housing in which a construction unit (transformer, rectifier, frequency converter and the like) is provided to produce the welding current and the welding voltage. Moreover, controls are provided in addition to the welding current and welding voltage regulating devices inside the housing by means of which certain control functions are undertaken when operating the welding current source. In case the arc welding apparatus is constructed as a shielded arc welding apparatus with an ablating or consummable electrode, a wire feed roll as well as a wire feed is additionally provided near or in the current source. The controls include in a shielded arc welding apparatus as a rule the following functions:
two cycle control
four cycle control
contact ignition (scratch ignition)
spot welding.

A two cycle control relates to a control in which during the first cycle (torch switch depressed) the gas flows, the welding voltage reaches the wire electrode and starts the wire motion. During the second cycle (torch switch released) gas, welding voltage and wire motion are switched off.

A four cycle control relates to a control in which during the first cycle (torch switch depressed) the gas flows and the welding voltage reaches the wire electrode. During the second cycle (torch switch released), the wire motion starts up. The third cycle (torch switch depressed) causes the welding voltage and the wire motion to be switched off. During the fourth cycle (torch switch released) the gas is switched off.

In scratch ignition, the torch switch is depressed and released as a result of which the welding voltage reaches the electrode. When touching the workpiece, the gas and wire feed are switched on. When pulling the arc, the gas and wire feed are switched off. In spot welding, the torch switch is depressed and released as a result of which the gas flows, the welding voltage reaches the wire electrode and then the wire feed starts up. The termination of spot welding takes place by means of a time interval relay with which after completion of the set time interval the wire feed welding voltage and gas flow are turned off.

As can be seen in the description of the above mentioned control function, gas valves, the motor of the wire feed as well as current relay and solenoid are controlled with the controls in periodic independence of each other. In order to guarantee an optimal functioning of the controls and consequently of the entire welding apparatus it is, therefore, expedient to test the machines, especially the controls as well as the units controlled by the controls, from time to time for their functionality (maintenance).

It is, moreover, necessary, in addition to the maintenance, in order to detect defects during repair work to test the individual control functions, the controlled components as well as the complete controls with respect to incoming and outgoing signals to be able to localize the defects which occurred.

This work was carried out thusfar with current and voltage indicating instruments.

SUMMARY OF THE INVENTION

It is the objective of the present invention to provide an apparatus of the above mentioned type in which the control function as well as the function of the units to be controlled and also the incoming and outgoing signals of the controls can be checked and indicated in the most simple type and manner.

To meet this objective, it is proposed according to the present invention that a diagnostic apparatus can be hooked up to the current source and/or controls. It is possible in the simplest manner to examine with this diagnosis apparatus the function of all controls. Conclusions can be drawn from the obtained test results about the units controlled by the controls such as motor, solenoid and valve as well as the switch which controls the controls such as torch push button, selection switch on the controls and current relay.

Recall and indicating circuits are provided in the diagnosis apparatus for monitoring the control signals emitted by the controls as well as the live voltages and flowing currents for the controls and units of the current source to be controlled in an advantageous further development of the invention. Furthermore, supply and control circuits for operating simulation of the controls and of the current source units to be controlled are arranged in the diagnosis apparatus. It becomes advantageously possible as a result of this construction to indicate, on the one hand, the input and output of the controls in the simplest manner and to examine, on the other hand, via the provided supply and control circuit for operating simulation the entire functioning of the controls in connection with the units to be controlled so that in this manner defects in components which serve to produce the input signals for the controls can be examined for their functionality.

The diagnosis apparatus is preferably constructed like a plug-in module as a result of which a particularly simple and convenient method of construction is made possible. In an advantageous further development, it is proposed that the controls are provided in the current source housing front side as a slide-in unit in which the diagnosis apparatus hook-up is arranged in such a way that when the slide-in unit is partially pulled out, the diagnosis plug-in module can be plugged in from the top. This guarantees that when the diagnosis plug-in module is not plugged in, the appropriate hook-ups are provided dust- and dirt-shielded inside the controls and inside the current source housing. As a result of plugging in with pulled out controls, a particularly simple use and simple diagnosis of possibly occurring defects in the controls is possible, since the current source can now be scanned in addition to the adjusting elements normally found on the front plate with one glance of the corresponding indicating and recall circuits of the diagnosis apparatus.

THE DRAWINGS

The invention is explained below in detail by means of an examplified embodiment and with reference to the drawings:

FIG. 1 shows a current source control with an associated diagnosis apparatus; and FIG. 2 and FIG. 3 show a diagrammatic drawing of an apparatus for shielded arc welding with a plugged in diagnosis apparatus.

DETAILED DESCRIPTION

An arc welding apparatus, in this case, a shielded arc welding apparatus with an ablating electrode, which has a current source 10 with controls 11 to influence the welding process is shown in the examplified embodiments. The construction of the current source 10 is not shown in detail since this is known per se. Supply units 12, functional control components 13, as well as a motor control 14 for the wire feed motor 15 are provided in the controls 11. A control selector switch which can be placed in four positions 16 is furthermore associated with the controls 11, to be sure:

position 17—four cycle
position 18—two cycle
position 19—scratching
position 20—spotting.

A gas valve 21, a solenoid 22 as well as a current relay 23 are furthermore associated with the outlet of the controls 11. These components 21-23 as well as the motor 15 are controlled via the controls. According to the invention, a diagnosis apparatus 24 is associated with the controls 11. The diagnosis apparatus 24 has a recall circuit 25 as well as indicating circuits 26, 27, for checking the control signals emitted by the controls as well as the live voltages and flowing currents for the controls and units of the current source to be controlled.

Recall circuit 25 is here provided with a switch 28 with which twelve different signals can be recalled. Moreover, the diagnosis system has a control circuit 29 with which an operating simulation of the controls as well as of the current source units to be controlled can be undertaken. The circuit 29 has push buttons 30, 31 and 32 so that appropriate trigger impulses for actuating the controls can be realized. The indicating circuits are preferably made like LED indicators and provided with corresponding diodes 1 to 13 as well as 14 to 26. As shown in FIG. 1, monitoring of the supply unit 12 takes place here via leads 33 and switch 16 which is associated with the diode indicating circuit 14 to 26. The connection as well as the controls of the LED circuits are selected here in such a way that when diodes 19, 20 and 21 light up, the recalled voltage or current lies in the permissible tolerance range. These diodes are preferably kept green. During deviations from the given voltage current value, either the diodes 22 to 26 (below tolerance value) or 14 to 18 light up (tolerance value exceeded). The diodes 14 to 18 and 22 to 26 are preferably made as diodes (LED) which emit red.

The diodes (LED) 1 to 13 of the indicating circuit 27 are connected via leads 34 to 46 with the controls (leads 37 to 46) as well as with the switch 18 (leads 34 to 36). The output signals of the controls as well as of the switch 18 can consequently be checked. Moreover, signals are supplied by the control circuit 29 via leads 47, 48 and 49 of the controls to achieve the above mentioned operating simulation.

A voltage supply apparatus 55 is furthermore provided in the diagnosis apparatus which serves to supply the circuit so that the diagnosis apparatus is independent of the current source controls.

The supply voltage apparatus 55 is connected with the supply voltage for the controls via leads 56.

It can be seen from FIGS. 1, 2 and 3 that the diagnosis apparatus 24 is preferably constructed like a plug-in module whereby the plug-in molding is diagrammatically shown and designated with 50.

FIGS. 2 and 3 particularly illustrate how the controls 11 are provided as a slide-in unit in the current source housing front surface 51. The diagnosis apparatus hookup 52 is arranged in the slide-in unit in such a way that when the slide-in unit 11 is partially pulled out (direction of arrow 53 in FIG. 3), the diagnosis plug-in module 24 can be plugged in from the top in the direction of the arrow 54 to the complementary slide-in unit connectors. As a result of this construction, an especially simple and clear diagnosis can be attained.

The functioning as well as the resultant indications during the actuation of the switches 16, 28, 30, 31, 32 are presented in the following tables.

| I. Function to be checked | | selector switch 28 posit. | indication LED 14-26 U, I | LED 1-13 |
|---|---|---|---|---|
| supply voltages | voltage tolerance of the supply voltage | | | |
| | ~42 V | 1 | within tol. green/yellow otherwise red | |
| | +15 V | 2 | within tol. green/yellow otherwise red | |
| | −15 V | 3 | within tol. green/yellow otherwise red | |
| | +24 V | 9 | within tol. green/yellow otherwise red | |
| selector switch 16 | position 4-cycle-17 | | | no indication |
| | position 2-cycle-18 | | | 1 |
| | position scratch-19 | | | 2 |
| | position spot-20 | | | 3 |
| set value | motor speed set point | 4 | 0-green/yellow | |
| | ignition feed set pnt. | 5 | 0-green/yellow | |
| | torch potentiometer testing | 10 | 0-green/yellow | |
| control output | gas valve 21 | | | 4 |
| | solenoid 22 | | | 5 |
| | current relay 23 | | | 6 |
| motor | motor control | | | 10 and 11 |

| I. Function to be checked | | selector switch 28 posit. | indication LED 14-26 U, I | LED 1-13 |
|---|---|---|---|---|
| voltages | motor voltage | 11 | O-green/yellow | 12 and 13 |
| | motor voltage motor torch 15 | | | |
| motor currents | current limitation | 6 | all LED on green/yellow | 8 |
| | current limitation/ motor torch | 12 | | |
| | motor braking | | | 9 |
| | motor on | | | 7 |

FUNCTION PROGRESSES

The function progresses 4-cycle, 2-cycle, scratching, spotting and wire feed can be simulated by the pushbuttons 30, 31, 32 of the diagnosis apparatus 24.

| function | controlling signal | reaction current source | indication LED 1—13 |
|---|---|---|---|
| wire feed | push wire feed push button 32 | motor 15 runs | 7, 12 and 13 |
| | release wire feed push button 32 | motor 15 brakes | 9 lights up briefly |
| 4-cycle | operating-like selector switch 16 in position 4-cycle (posit. 17) | | 10/11 |
| | depress pushbutton 30 | gas valve 21 opens | 4 |
| | release push-button 30 | main solenoid 22 energizes, motor 15 runs with ignition feed | 5 and 7, 12, 13 |
| | depress current relay pushbutton 15 | current relay 23 energizes motor 15 runs at the set speed | 6 |
| | depress torch pushbutton 30 | motor 15 brakes | 9 lights up briefly 7, 12 and 13 off 5 off-delayed |
| | release torch pushbutton 30 | | |
| | release current relay 31 | current relay 23 drops out gas valve 21 closes | 6 off 4 off-delayed |

| III. function | controlling signal | reaction current source | indication LED 1—13 |
|---|---|---|---|
| 2-cycle | operating-like selector switch 16 in position 18 2-cycle | | 1 |
| | depress torch push-button 30 | gas valve 21, solenoid 22 energized motor 15 runs with ignition feed | 4, 5, 7 12 and 13 on |
| | depress current relay pushbutton 31 | current relay 23 is energized motor 15 runs at the speed set with the wire feed potentiometer | 6 |
| | release torch push-button 30 | motor 15 brakes | 9 lights up briefly 5 off-delayed 7, 12 and 13 off |
| | release current relay pushbutton 31 | current relay 23 off, gas valve 21 closes-delayed | 6 off 4 off-delayed |
| scratch-ing | operating-like selector switch 16 in position | | 2 |

-continued

| | | | |
|---|---|---|---|
| | 19 scratching | | |
| | depress and release torch pushbutton 30 | main solenoid on | 5 |
| | depress current relay pushbutton 31 | gas valve 21 opens | 4 |
| | | motor 15 runs | 7, 12 and 13 |
| | | current relay 23 is energized | 6 |
| | release current relay pushbutton 31 | gas valve 21 closes-delayed | 4 off-delayed |
| | | motor 15 brakes | 9 lights up briefly 7, 12 and 13 off |
| | | current relay 23 drops out | 6 off |
| | depress and release torch pushbutton 30 | solenoid 22 drops out | 5 off |

| IV. function | controlling signal | reaction current source | indication LED 1—13 |
|---|---|---|---|
| spotting | operating-like selector switch 16 in position 20 spotting | | 3 |
| | depress torch pushbutton 30 | gas valve 21 opens | 4 |
| | release torch pushbutton 30 | solenoid 22 on | 5 |
| | | motor 15 runs with ignition feed | 7, 12 and 13 |
| | depress current relay pushbutton 31 | current relay 23 is energized motor 15 runs at set speed | 6 |
| | switch off after set period | solenoid 22 off | 5 off |
| | | motor 15 brakes | 7, 12 and 13 off 9 on briefly |
| | release current relay pushbutton 31 | gas valve 21 closes-delayed | 4 off-delayed 6 off |

What is claimed is:

1. In an apparatus for arc welding or plasma cutting wherein the apparatus includes welding/cutting equipment having a current source in a current source housing as well as a set of controls to influence the welding/cutting process, the improvement being a diagnosis apparatus selectively operatively hooked up to at least one of said current source and said controls, said diagnosis apparatus containing indicating means for indicating signals transmitted from said controls and/or the current source units to be controlled, said diagnosis apparatus further containing switching circuits for simulating the operation of said controls and/or the current source units to be controlled, said diagnosis apparatus further having circuits for monitoring the live voltages and flowing currents for said controls and the units to be controlled of said current source, said current source housing having a front face with an openable door for exposing a slide-in unit, said slide-in unit being slidable partially out of said housing and having an exposed upper surface upon being partially pulled out, said diagnosis apparatus being constructed as a plug-in module having connectors, said slide-in unit having complementary connectors exposed on its upper surface whereby said slide-in unit may be selectively operatively connected to said plug-in module, and said slide-in unit connectors being shielded within said housing upon disconnection of said plug-in module and upon closure of said housing front face.

2. Apparatus according to claim 1, characterized in that said diagnosis apparatus includes indicating circuits for monitoring the control signals emitted by said controls as well as the live voltages and flowing currents for said controls and for said units of said control source, said diagnosis apparatus further including a recall circuit having a switch for selectively recalling a plurality of different signals, and said diagnosis apparatus further including a control circuit having a plurality of push buttons for selectively triggering impulses for said operation simulation.

3. Apparatus according to claim 2, characterized in that said indicating circuits comprises a pair of indicating circuits in the form of LED indicators provided with a plurality of diodes, said indicating circuits being connected to said controls and to a multi-position control selector for checking the output signals of said controls and of said control selector, and said diagnosis apparatus further being provided with voltage supply means whereby said diagnosis apparatus is independent of said current source.

4. In a method for testing arc welding or plasma cutting equipment having a current source in a housing and a set of controls to influence the welding/cutting process, the improvement being opening a door in the front face of the housing to expose a slide-in unit, partially pulling the slide-in unit out of the housing to expose connectors in the top surface of the slide-in unit, providing a diagnosis apparatus in the form of a plug-in module having connectors exposed on its lower surface, interconnecting the connectors of the slide-in unit and the plug-in module by moving the plug-in module connectors downwardly toward the slide-in unit connectors to thereby selectively operatively connect the diagnosis apparatus to the current source and/or controls during the non-operative conditions of the equipment, indicating by means of indicating means in the diagnosis apparatus signals transmitted from the controls and/or the current source units to be controlled, simulating by means of switching circuits in the diagnosis apparatus operation of the controls and/or of the current source units to be controlled utilizing circuits in the diagnosis apparatus to monitor the live voltages and flowing currents for the controls, disconnecting the plug-in module from the slide-in unit, and pushing the slide-in unit back into the housing and closing the front face of the housing to shield the slide-in unit connectors within the housing during the operative condition of the equipment.

* * * * *